US010802620B2

(12) United States Patent
Noda

(10) Patent No.: US 10,802,620 B2
(45) Date of Patent: Oct. 13, 2020

(54) INFORMATION PROCESSING APPARATUS AND INFORMATION PROCESSING METHOD

(71) Applicant: SONY CORPORATION, Tokyo (JP)

(72) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 15/554,807

(22) PCT Filed: Dec. 7, 2015

(86) PCT No.: PCT/JP2015/084316
§ 371 (c)(1),
(2) Date: Aug. 31, 2017

(87) PCT Pub. No.: WO2016/147498
PCT Pub. Date: Sep. 22, 2016

(65) Prior Publication Data
US 2018/0239440 A1 Aug. 23, 2018

(30) Foreign Application Priority Data

Mar. 17, 2015 (JP) ................................. 2015-053848

(51) Int. Cl.
G06F 3/01 (2006.01)
G06F 3/03 (2006.01)
(Continued)

(52) U.S. Cl.
CPC .............. G06F 3/038 (2013.01); G06F 3/013 (2013.01); G06F 3/0346 (2013.01);
(Continued)

(58) Field of Classification Search
CPC .... G06F 3/017; G06F 3/04883; G06F 3/0487; G06F 3/0488; G06F 3/04886; G06F 2203/04808; G06F 3/013
See application file for complete search history.

(56) References Cited

U.S. PATENT DOCUMENTS 9,383,579 B2 * 7/2016 Madau ..................... A61B 5/18
2002/0105482 A1 * 8/2002 Lemelson ............... G06F 3/013
345/7
(Continued)

FOREIGN PATENT DOCUMENTS

JP 8-241163 A 9/1996
JP 2013-210742 A 10/2013
(Continued)

OTHER PUBLICATIONS

International Search Report and Written Opinion of PCT Application No. PCT/JP2015/084316, dated Feb. 16, 2016, 01 pages of English Translation and 07 pages of ISRWO.

Primary Examiner — William Lu
(74) Attorney, Agent, or Firm — Chip Law Group

(57) ABSTRACT

Provided is an information processing apparatus including an acquiring unit that acquires information indicating user operation, and a display control unit that determines whether or not to control a display position of an indicator using gaze input in accordance with whether or not a difference between a position of the indicator indicating an operation position operated by a user indicated by the information acquired by the acquiring unit and a position of a gazing point of the user exceeds a threshold.

10 Claims, 6 Drawing Sheets

(51) Int. Cl.
*G06F 3/0481* (2013.01)
*G06F 3/038* (2013.01)
*G06F 3/0346* (2013.01)
*G06F 3/0484* (2013.01)

(52) U.S. Cl.
CPC ...... G06F 3/04812 (2013.01); G06F 3/04842 (2013.01); *G06F 2203/0381* (2013.01)

(56) References Cited

U.S. PATENT DOCUMENTS

| | | | | |
|---|---|---|---|---|
| 2007/0040813 A1* | 2/2007 | Kushler | ............... | G06F 3/0237 345/173 |
| 2007/0126698 A1* | 6/2007 | Iwamoto | ............ | G01C 21/3664 345/156 |
| 2007/0165019 A1* | 7/2007 | Hale | ....................... | G06Q 10/00 345/418 |
| 2010/0238280 A1* | 9/2010 | Ishii | ...................... | B60K 35/00 348/77 |
| 2012/0215403 A1* | 8/2012 | Tengler | ................ | B60W 50/12 701/36 |
| 2012/0272179 A1* | 10/2012 | Stafford | .................. | G06F 3/012 715/781 |
| 2013/0222270 A1* | 8/2013 | Winkler | .............. | H04M 1/0233 345/173 |
| 2014/0085189 A1* | 3/2014 | Shimasaki | .............. | G06F 3/013 345/156 |
| 2014/0320397 A1* | 10/2014 | Hennessey | .............. | A61B 3/113 345/156 |
| 2015/0154461 A1* | 6/2015 | Kitaura | .............. | G06K 9/00845 348/148 |
| 2015/0177833 A1* | 6/2015 | Vennstrom | .............. | G06F 3/013 345/156 |
| 2015/0210292 A1* | 7/2015 | George-Svahn | ...... | B60W 50/10 701/45 |
| 2015/0268994 A1* | 9/2015 | Okabayashi | ............ | G06F 9/542 718/103 |
| 2016/0088231 A1* | 3/2016 | Oku | .................... | H04N 5/2259 348/222.1 |
| 2016/0089980 A1* | 3/2016 | Kurahashi | ............... | G06F 3/013 345/156 |
| 2016/0170485 A1* | 6/2016 | Naruse | ................... | B60K 35/00 345/8 |
| 2016/0179189 A1* | 6/2016 | Shibata | ................. | B60K 35/00 345/156 |
| 2018/0367665 A1* | 12/2018 | Guisti | .................. | H04W 4/027 |

FOREIGN PATENT DOCUMENTS

| | | |
|---|---|---|
| JP | 2015-118531 A | 6/2015 |
| WO | 2015/092995 A1 | 6/2015 |

* cited by examiner

FIG. 4
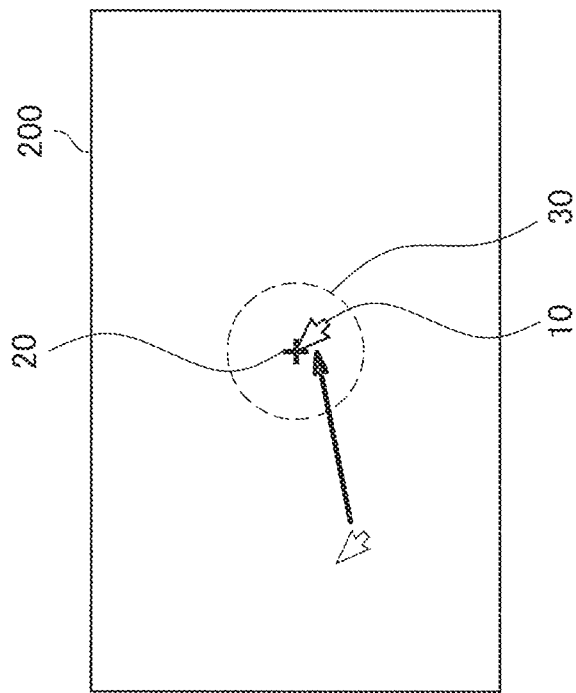
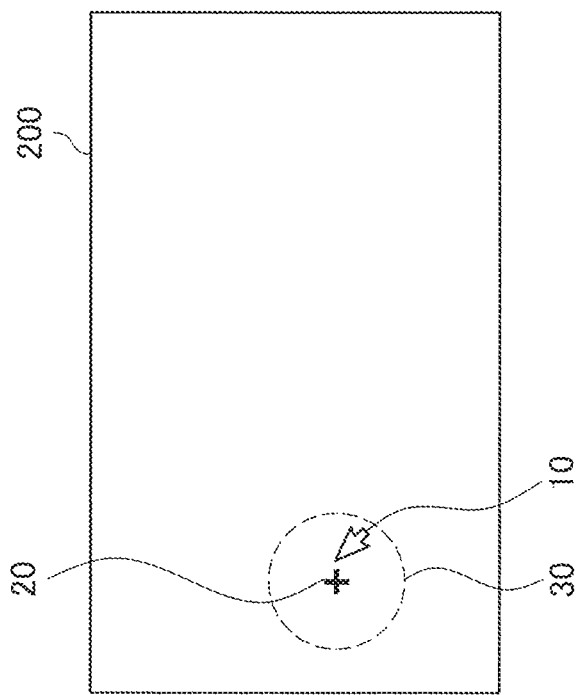

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/084316 filed on Dec. 7, 2015, which claims priority benefit of Japanese Patent Application No. JP 2015-053848 filed in the Japan Patent Office on Mar. 17, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, multimodal interface has been focused on, which enables input of information using a plurality of types of input means (modals) such as GUI input, voice input and gaze input. Because the multimodal interface allows utilization of a plurality of types of modals, it is desirable that each type of modals can be appropriately and differently used.

As an example of technologies to realize this, the following Patent Literature 1 discloses a technology of, in the case where coordinate input means for inputting an indicator through gaze input is newly provided, enabling only any one of coordinate input means so that an input signal from gaze input and input signals from other coordinate input means do not collide with each other.

CITATION LIST

Patent Literature

Patent Literature 1: JP H8-241163A

DISCLOSURE OF INVENTION

Technical Problem

As one of convenient modals, there is gaze input. A gaze input technology is a technology of tracking a direction or movement of the line of sight of a user and reflecting the tracking result on movement, or the like, of an indicator such as a pointer and focus. While the gaze input technology is convenient because the line of sight of the user can be directly reflected on input, the technology is inconvenient because movement of the line of sight which is not intended to be used for input, such as wobble of the line of sight is also reflected on input. However, the above-described Patent Literature 1 only discloses enabling only any one of modals, and, in the case where gaze input is enabled, the user is still forced to withstand the above-described inconvenience.

Therefore, the present disclosure proposes new and improved information processing apparatus, information processing method and program which can control a display position of an indicator on the basis of movement of the line of sight which is intended to be used for input.

Solution to Problem

According to the present disclosure, there is provided an information processing apparatus including: an acquiring unit configured to acquire information indicating user operation; and a display control unit configured to determine whether or not to control a display position of an indicator using gaze input in accordance with whether or not a difference between a position of the indicator indicating an operation position operated by a user indicated by the information acquired by the acquiring unit and a position of a gazing point of the user exceeds a threshold.

Further, according to the present disclosure, there is provided an information processing method executed by a processor, the method including: acquiring information indicating user operation; and determining whether or not to control a display position of an indicator using gaze input in accordance with whether or not a difference between a position of the indicator indicating an operation position operated by a user indicated by the acquired information and a position of a gazing point of the user exceeds a threshold.

Further, according to the present disclosure, there is provided a program causing a computer to function as: an acquiring unit configured to acquire information indicating user operation; and a display control unit configured to determine whether or not to control a display position of an indicator using gaze input in accordance with whether or not a difference between a position of the indicator indicating an operation position operated by a user indicated by the information acquired by the acquiring unit and a position of a gazing point of the user exceeds a threshold.

Advantageous Effects of Invention

As described above, according to the present disclosure, it is possible to control a display position of an indicator on the basis of movement of the line of sight which is intended to be used for input. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram for explaining an input restriction function of the information processing apparatus according to the present embodiment.

MODE(S) FOR CARRYING OUT THE INVENTION

Figure 1:
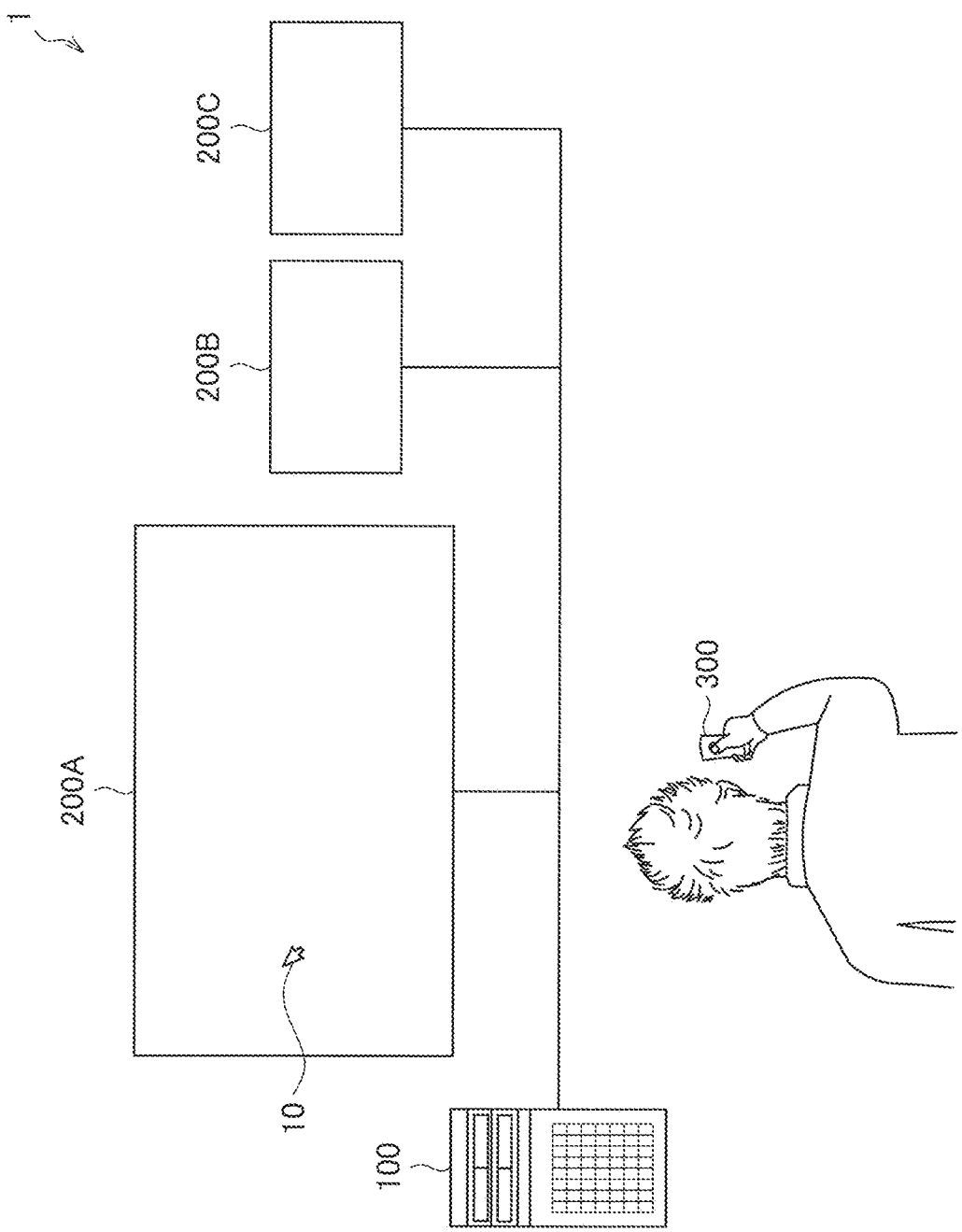
FIG. 1 is a diagram for explaining outline of an information processing system according to the present embodiment.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Further, in the present description and drawings, a plurality of components having substantially the same functional configuration may be distinguished from each other by each of the components having a different alphabetical letter added to the end of the same reference numeral. In one example, a plurality of components having substantially the same functional configuration may be distinguished from each other as necessary, such as display apparatuses 200A, 200B, and 200C. However, if it is not particularly necessary to distinguish each of a plurality of components having substantially the same functional configuration, only the same reference numeral is assigned. In one example, if it is not particularly necessary to distinguish among the display apparatuses 200A, 200B, and 200C, they are simply referred to as a display apparatus 200.

Note that description will be provided in the following order.
1. Introduction
1.1. Overall configuration
1.2. Technical problem
2. Configuration example
3. Technical characteristics
3.1. Operation information acquisition function
3.2. Multimodal interface function
3.3. Priority setting function
3.4. Input restriction function
3.5. Gaze input assistance function
4. Operation processing example
5. Specific example
6. Hardware configuration example
7. Conclusion

1. INTRODUCTION

Outline of an information processing apparatus according to an embodiment of the present disclosure will be described first with reference to FIG. 1.

<1.1. Overall Configuration>

FIG. 1 is a diagram for explaining outline of an information processing system 1 according to the present embodiment. As illustrated in FIG. 1, the information processing system 1 includes an information processing apparatus 100 and a display apparatus 200. Further, the information processing system 1 may include an operating apparatus 300. In the example illustrated in FIG. 1, a user holds the operating apparatus 300 and operates an indicator 10 (pointer) displayed at the display apparatus 200A.

The operating apparatus 300 is an apparatus which accepts operation performed by the user. The operating apparatus 300 illustrated in FIG. 1 is a gyro mouse. The gyro mouse 300 has an inertial sensor such as an acceleration sensor and a gyro sensor inside and can reflect inclination, acceleration, or the like, on a position and movement of the indicator 10. The operating apparatus 300 may be implemented with various apparatuses such as a mouse, a keyboard and a touch pad.

The display apparatus 200 is an apparatus which displays information. The display apparatuses 200A, 200B and 200C illustrated in FIG. 1 are displays. The display apparatus 200 can display arbitrary content such as an image, video, application, text and web content. Further, the display apparatus 200 displays the indicator 10 such as a pointer, focus and a cursor, which indicates an operation position. The display apparatus 200 communicates with the information processing apparatus 100 in a wired or wireless manner and displays the indicator 10 on the basis of control by the information processing apparatus 100.

The information processing apparatus 100 is an apparatus which controls a display position of the indicator displayed at the display apparatus 200. The information processing apparatus 100 illustrated in FIG. 1 is a personal computer (PC). For example, the information processing apparatus 100 controls the display position of the indicator 10 on the basis of information acquired by the operating apparatus 300. The information processing apparatus 100 may, for example, have a sensor for detecting the line of sight or voice of the user and may accept operation of the indicator using voice input or gaze input.

Note that the information processing system 1 can take various kinds of forms in addition to the example illustrated in FIG. 1. For example, the information processing apparatus 100 and the display apparatus 200 may be implemented with a head mounted display (HMD). In this case, for example, gaze input can be realized by the line of sight being detected by a camera directed to both eyes of the user who wears the HMD.

<1.2. Technical Problem>

It can be said that gaze input is effective compared to other modals in a situation where the whole screen does not fall within view because a screen is large as the display apparatus 200A or there exist a plurality of screens as the display apparatuses 200B and 200C. This is because an input range of gaze input is wide, and the user rarely loses sight of the indicator because the indicator follows the line of sight. Further, in the case where an amount of movement of the indicator is large, while, for example, it is necessary to perform operation of moving a mouse back and forth many times if input is performed using the mouse, such troublesome operation is not required with gaze input. Concerning this, while the above-described troublesome operation is alleviated by increasing the amount of movement of the indicator with respect to an amount of movement of the mouse, pointing accuracy degrades as an adverse effect.

However, as described above, while the gaze input technology is convenient because the line of sight of the user can be directly reflected on input, the technology is inconvenient because movement of the line of sight which is not intended to be used for input, such as wobble of the line of sight, is also reflected on input. Therefore, in view of the above-described circumstances, the information processing apparatus 100 according to an embodiment of the present disclosure has been created. The information processing apparatus 100 according to the present embodiment can alleviate the above-described inconvenience of multimodal interface by appropriately combining gaze input and other modals.

The outline of the information processing apparatus 100 according to the present embodiment has been described above. A configuration example of the information processing apparatus 100 according to the present embodiment will be described next with reference to FIG. 2.

2. CONFIGURATION EXAMPLE

Figure 2:
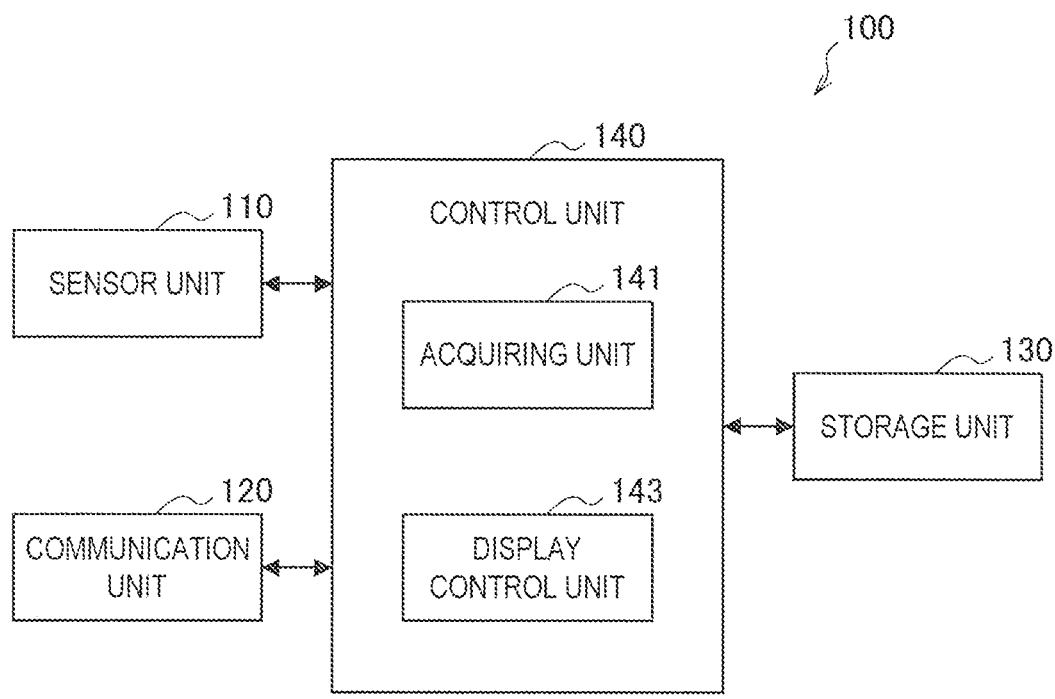
FIG. 2 is a block diagram illustrating an example of a logical configuration of the information processing apparatus according to the present embodiment.

FIG. 2 is a block diagram illustrating an example of a logical configuration of the information processing apparatus 100 according to the present embodiment. As illustrated in FIG. 2, the information processing apparatus 100 includes a sensor unit 110, a communication unit 120, a storage unit 130 and a control unit 140.

The sensor unit 110 has a function of detecting various kinds of information relating to user operation. For example, the sensor unit 110 can be implemented with an image sensor which senses a user as a target, a depth sensor, a microphone, or the like. Note that, in order to improve accuracy of detection of the line of sight, the sensor unit 110 regarding gaze input is preferably provided at a position where an eye of the user can be sensed from the front, near the display apparatus 200 or at an HMD, glasses, or the like. The sensor unit 110 outputs detected information to the control unit 140.

The communication unit 120 has a function of transmitting/receiving data to/from other apparatuses. The communication unit 120 communicates with other apparatuses directly using a scheme such as, for example, a local area network (LAN), a wireless LAN, wireless fidelity (Wi-Fi, registered trademark), infrared communication and Bluetooth (registered trademark) or indirectly via a network access point, or the like. For example, the communication unit 120 receives information acquired by the operating apparatus 300 or transmits information indicating a display position of the indicator to the display apparatus 200.

The storage unit 130 records/reproduces data in/from a predetermined recording medium. For example, the storage unit 130 stores history of the position of the indicator and a position of a gazing point or stores setting of a size of a gazing region (magnitude of a threshold) which will be described later.

The control unit 140, which functions as an arithmetic processing unit and a control apparatus, controls the whole operation within the information processing apparatus 100 in accordance with various kinds of programs. As illustrated in FIG. 2, the control unit 140 functions as an acquiring unit 141 and a display control unit 143. The acquiring unit 141 has a function of acquiring information indicating user operation. The display control unit 143 has a function of controlling a display position of the indicator to be displayed at the display apparatus 200.

The configuration example of the information processing apparatus 100 according to the present embodiment has been described above. Technical characteristics of the information processing apparatus 100 according to the present embodiment will be described next with reference to FIG. 3 and FIG. 4.

3. TECHNICAL CHARACTERISTICS

<3.1. Operation Information Acquisition Function>

The information processing apparatus 100 (for example, the acquiring unit 141) according to the present embodiment has a function of acquiring information indicating user operation.

Here, the information indicating user operation includes information indicating an instruction for moving the indicator, information indicating an instruction for selecting a display object, information indicating an instruction for displaying menu, trigger information which will be described later, and the like. Hereinafter, the information indicating user operation will be also referred to as operation information.

For example, the acquiring unit 141 may acquire operation information on the basis of information detected by the sensor unit 110. Specifically, the acquiring unit 141 may acquire operation information regarding gaze input, such as a position of a gazing point and a moving direction and speed of the line of sight by recognizing the position of an eye of the user and the direction of the line of sight on the basis of image information and depth information. Further, the acquiring unit 141 may acquire operation information regarding gesture input by recognizing user gesture on the basis of image information and depth information. Still further, the acquiring unit 141 may acquire operation information regarding voice input by recognizing user voice on the basis of voice information.

For example, the acquiring unit 141 may acquire operation information on the basis of information received from the operating apparatus 300 by the communication unit 120. Specifically, the acquiring unit 141 may acquire operation information regarding touch input, mouse input or keyboard input on the basis of information indicating touch to a touch pad, movement of a mouse or depression of a key of a keyboard.

<3.2. Multimodal Interface Function>

The information processing apparatus 100 (for example, the display control unit 143) according to the present embodiment has a function of providing multimodal interface. For example, the display control unit 143 controls a display position of the indicator on the basis of operation information of various kinds of modals. Here, gaze input will be particularly described.

For example, the display control unit 143 controls the display position of the indicator using gaze input. Note that control of the display position of the indicator using gaze input is control of the display position based on operation information regarding gaze input. Specifically, the display control unit 143 controls the display position of the indicator using a position of a gazing point. The gazing point is a point the user gazes at, and is, for example, an arbitrary point on a display surface of the display apparatus 200. For example, the display control unit 143 displays the indicator at the position of the gazing point. Because there can be a case where an error occurs between the position of the gazing point and a position where the user actually desires to set the indicator, the display control unit 143 may correct the display position of the indicator at a position appropriately displaced from the position of the gazing point while taking into account this error. In this manner, control of the display position of the indicator using gaze input is realized.

<3.3. Priority Setting Function>

The information processing apparatus 100 (for example, the display control unit 143) according to the present embodiment has a function of reflecting operation information on display on the basis of priority set for each modal.

Figure 3:
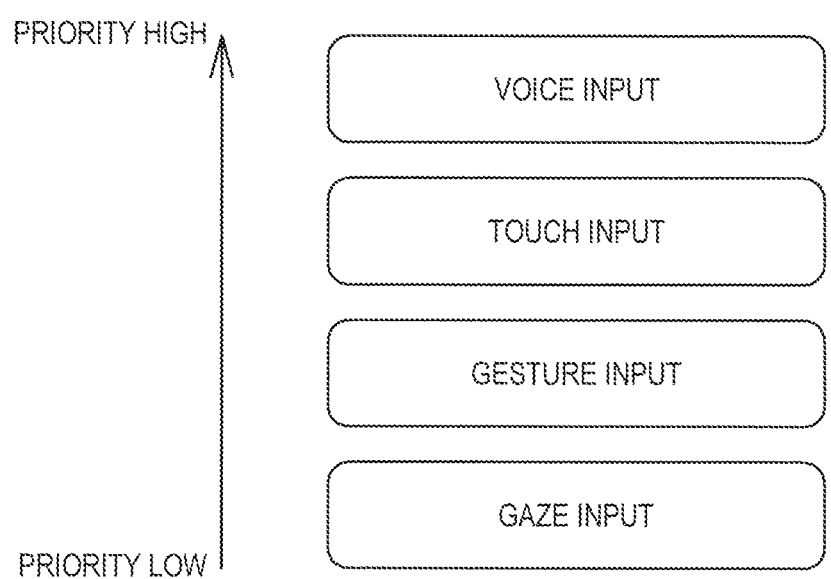
FIG. 3 is a diagram illustrating an example of priority set for each modal.

For example, the display control unit 143 may set higher priority for a modal with higher operation load for the user or higher operation accuracy or higher reliability. As an example, FIG. 3 illustrates a setting example of the priority. FIG. 3 is a diagram illustrating an example of priority set for each modal. In the example illustrated in FIG. 3, lower priority is set for gaze input, gesture input, touch input and voice input in this order.

For example, the display control unit 143 may select operation information to be reflected on display from operation information using one or more modals acquired by the acquiring unit 141 in accordance with the priority set for each modal. For example, the display control unit 143 preferentially selects operation information using a modal with higher priority. Specifically, regarding the example illustrated in FIG. 3, in the case where operation information regarding gaze input and operation information regarding gesture input are acquired at the same time, the display control unit 143 controls the display position of the indicator using the operation information regarding gesture input. By this means, the user can operate the indicator preferentially using a modal with higher priority. The user can perform operation while switching modals, for example, can perform operation involving a large amount of movement in a large screen or across a plurality of screens using gaze input and, perform subsequent minute operation using touch input, or the like. Further, in the case where an error occurs between the position of the gazing point and the position where the user actually desires to set the indicator, the user can perform adjustment using other modals. Note that the priority may be arbitrarily set by the user.

For example, the display control unit 143 may determine whether or not to control the display position of the indicator using gaze input in accordance with whether or not operation information using a modal for which priority higher than that of gaze input is set is acquired. For example, the display control unit 143 does not control the display position of the indicator using gaze input (disables gaze input) in the case where operation information using a modal for which priority higher than that of gaze input is set is acquired, and controls the display position of the indicator using gaze input (enables gaze input) in the case where the operation information is not acquired. Specifically, concerning the example illustrated in FIG. 3, the display control unit 143 controls the display position of the indicator using operation information regarding gaze input during a period in which the operation information regarding gaze input is acquired. The display control unit 143 controls the display position of the indicator using operation information regarding gesture input during a period in which the operation information regarding gaze input and the operation information regarding gesture input are acquired at the same time. In this manner, the user can smoothly perform operation while switching the modal without separately providing a switching instruction.

Here, there is a case where the information processing apparatus 100 can acquire information indicating that the user intends to move the indicator. For example, in the case where the user touches the touch pad, even if the user does not move the finger which touches the touch pad, it can be said that the user intends to move the indicator using the touch pad. Such information indicating that the user intends to move the indicator is also referred to as trigger information. The trigger information can be, for example, detected by the operating apparatus 300 and transmitted to the information processing apparatus 100. The information processing apparatus 100 may control the display position of the indicator in accordance with whether or not there is trigger information.

For example, the display control unit 143 may determine whether or not to control the display position of the indicator using gaze input in accordance with whether or not trigger information relating to a modal for which priority higher than that of gaze input is set is acquired. For example, the display control unit 143 disables gaze input in the case where trigger information relating to a modal for which priority higher than that of gaze input is set is acquired, and enables gaze input in the case where the trigger information is not acquired. By this means, the information processing apparatus 100 can control whether gaze input is enabled or disabled even in the case where there is no explicit user instruction for moving the indicator. Therefore, for example, in the case where the user is thinking without moving the finger while the user touches the touch pad, it is possible to avoid the indicator from following the line of sight which unconsciously moves.

<3.4. Input Restriction Function>

The information processing apparatus 100 (for example, the display control unit 143) according to the present embodiment has a function of appropriately restricting control of the display position of the indicator using gaze input.

For example, the display control unit 143 determines whether or not to control the display position of the indicator using gaze input in accordance with whether or not a difference between a position of the indicator operated by the user and a position of a gazing point of the user exceeds a threshold. For example, the display control unit 143 enables gaze input in the case where the difference exceeds the threshold and disables gaze input in the case where the difference does not exceed the threshold. As a specific method, the display control unit 143 may set a region in which a difference from the position of the gazing point falls within a range of the threshold and may disable gaze input in the case where the indicator is located within the region, while enabling gaze input in the case where the indicator is located outside the region. As another method, the display control unit 143 may set a region in which a difference from the position of the indicator falls within a range of the threshold and may disable gaze input in the case where the gazing point is located within the region, while enabling gaze input in the case where the gazing point is located outside the region. In the present specification, description will be provided assuming that the former method is employed as an example. Further, a region where a difference from the position of the gazing point falls within the range of the threshold will be also referred to as a gazing region. This function will be described in detail below with reference to FIG. 4.

FIG. 4 is a diagram for explaining the input restriction function of the information processing apparatus 100 according to the present embodiment. In the example illustrated in the left part of FIG. 4, the display apparatus 200 displays the indicator 10 near a gazing point 20, more specifically, inside a gazing region 30 which indicates that a difference from the position of the gazing point 20 falls within a range of a threshold. Note that it is assumed that the gazing point 20 and the gazing region 30 are not displayed. In the case where the indicator 10 is located within this gazing region 30, the display control unit 143 disables gaze input and maintains the position of the indicator 10 (does not move the position of the indicator 10) even if the gazing point 20 moves. On the other hand, as illustrated in the right part of FIG. 4, in the case where the gazing point 20 moves and the indicator 10 is located outside the gazing region 30, the display control unit 143 enables gaze input and displays the indicator 10 at the position of the gazing point 20. By movement of the indicator 10 in association with movement of the gazing point 20 being restricted within the gazing region 30 in this manner, it is possible to avoid movement of the indicator 10 due to minute wobble of the line of sight. Note that the display control unit 143 may disable gaze input in the case where operation using other modals with priority higher than that of gaze input is performed by the above-described priority setting function even if the indicator 10 is located outside the gazing region 30.

A value of the threshold, that is, a size of the gazing region 30 can be set on the basis of various kinds of information. An example of a threshold setting method will be described below.

For example, the display control unit 143 may set the threshold in accordance with accuracy of detection of the position of the gazing point (accuracy of detection of the line of sight). For example, the display control unit 143 sets a smaller value for the threshold for higher accuracy of detection of the line of sight and sets a greater value for lower accuracy. This is because an error between an actual gazing point and a gazing point recognized by the information processing apparatus 100 is smaller as accuracy of detection of the line of sight is higher, and the error is larger as the accuracy is lower. The accuracy of detection of the line of sight can be, for example, determined by resolution, or the like, of an image sensor included in the sensor unit 110. Typically, because accuracy of detection of the line of sight is improved as a distance between the sensor and the user is shorter, the display control unit 143 may set the threshold in accordance with the distance between the sensor unit 110 and the user. For example, the display control unit 143 sets a greater value as the threshold in the case where a sensor provided at a position far from the user, such as around a wall-hanging display is used, than in the case where a sensor provided very close such as glasses is used. By such setting, the information processing apparatus 100 can provide stable operability even in an environment where accuracy is poor.

For example, the display control unit 143 may set the threshold in accordance with a distance between a position of an eye of the user and the position of the gazing point. For example, the display control unit 143 sets a smaller value as the distance between the position of the eye of the user and the position of the gazing point is shorter and sets a greater value as the distance is longer. This is because an amount of movement of the gazing point with respect to an amount of movement of the line of sight of the user is larger as the distance is shorter, and the amount of movement of the gazing point with respect to the amount of movement of the line of sight of the user is smaller as the distance is shorter. Here, the position of the gazing point can be regarded as a focused position. For example, concerning a display, or the like, a position on a display surface is the position of the gazing point. Meanwhile, concerning an apparatus such as an HMD, which displays a virtual object on a lens having permeability while the virtual object is superimposed in real space, not a position on the lens but a position in real space on which the virtual object is actually superimposed becomes the position of the gazing point. The same also applies to a case where a virtual object is displayed while the virtual object is superimposed in virtual space. Through such setting, the information processing apparatus 100 can prevent the indicator from going outside the gazing region by slight wobble of the line of sight in the case where the distance between the position of the eye of the user and the position of the gazing point is longer. Further, the information processing apparatus 100 can move the indicator outside the gazing region with slight movement of the line of sight in the case where the distance between the position of the eye of the user and the position of the gazing point is shorter.

For example, the display control unit 143 may set the threshold in accordance with displayed content. For example, the display control unit 143 can set the gazing region in any window region in a multiwindow screen. In this case, gaze input is disabled within a window the user gazes at. Further, in the case where text is displayed, the display control unit 143 may set a region where text in an arbitrary unit, such as a unit of one line, sentence or paragraph is displayed as the gazing region. In this case, gaze input is disabled within one line, sentence or paragraph which the user gazes at. Through such setting, the information processing apparatus 100 can realize appropriate restriction of gaze input in accordance with content.

For example, the display control unit 143 may set a fixed value as the threshold. By this means, the information processing apparatus 100 can provide operability which does not fluctuate in accordance with environments. Note that this fixed value may be arbitrarily set by the user.

Note that the display control unit 143 may disable gaze input under other various conditions. For example, the display control unit 143 may disable gaze input in the case where moving speed of the line of sight falls below a threshold. This is because, in the case where the moving speed of the line of sight is fast, it can be considered that the user intends to perform input, while, in the case where the moving speed is slow, it can be considered that the user does not intend to perform input because the user is thinking, for example.

<3.5. Gaze Input Assistance Function>

The information processing apparatus 100 (for example, the display control unit 143) according to the present embodiment has a function of performing various kinds of assistance for improving convenience of gaze input.

For example, there is a case where the user places a pointer on a scroll bar, and the user browses a web page while scrolling. In such a case, the pointer wanders back and forth between the scroll bar and content within the browsed web page, which can lead to complicated display. Therefore, the display control unit 143 may, for example, automatically scroll down in the case where the position of the gazing point approaches a lower end of the web page. This avoids the above-described complicated display.

For example, there is a case where the user glances at a clock and return the line of sight to the original position. In such a case, the pointer wanders back and forth between the clock and content the user originally looks at, and the pointer can return to a position displaced from the original position. Therefore, the display control unit 143 may store the position of the indicator and the position of the gazing point in the storage unit 130 and may return the position of the indicator to the original position in the case where, for example, the gazing point returns to the vicinity of the original position of the gazing point within a predetermined period. By this means, because displacement of the position of the indicator is automatically corrected, time and effort to adjust the position using other modals are saved.

The technical characteristics of the information processing apparatus 100 according to the present embodiment have been described above. An operation processing example of the information processing apparatus 100 according to the present embodiment will be described next with reference to FIG. 5.

4. OPERATION PROCESSING EXAMPLE

Figure 5:
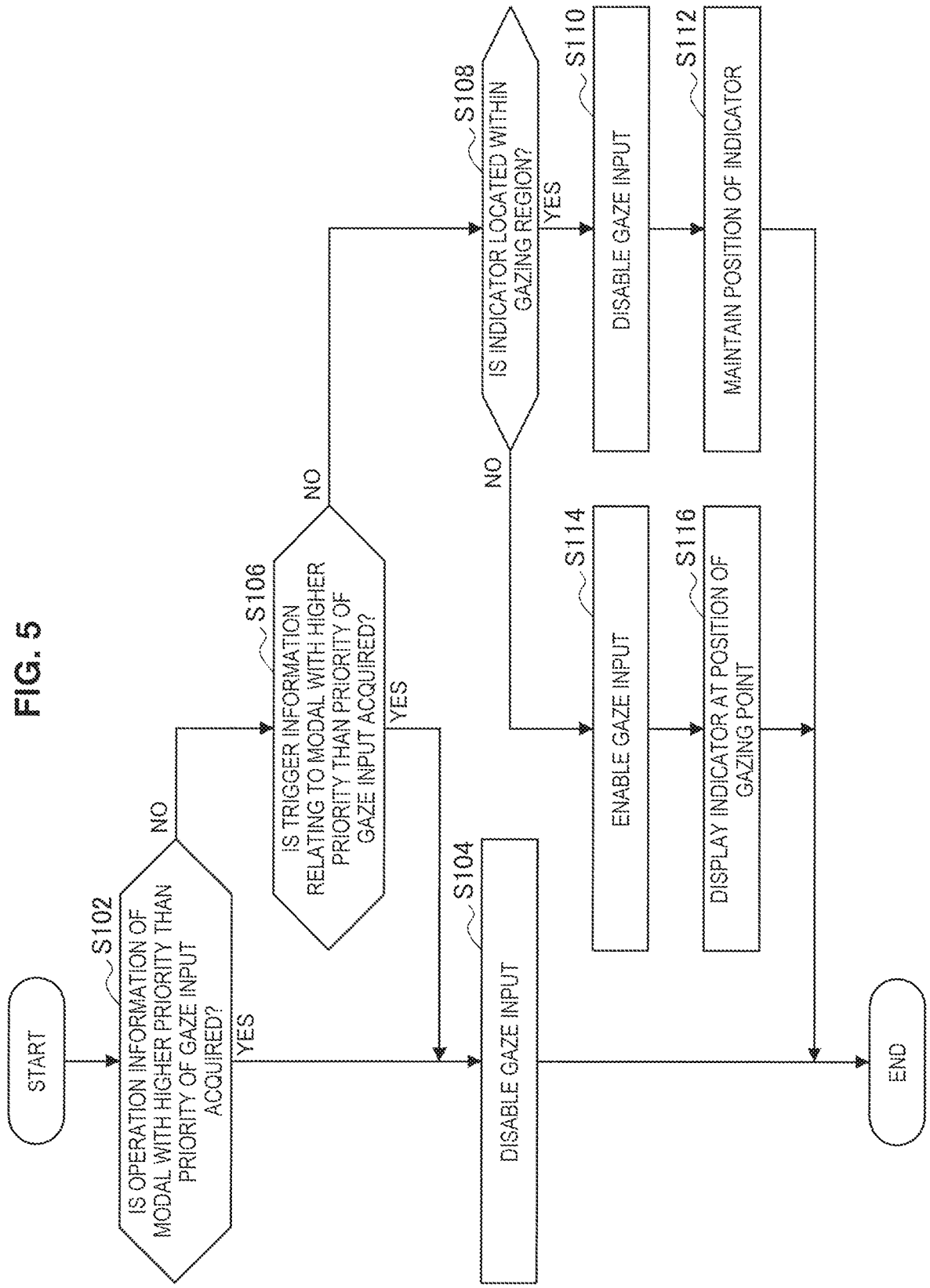
FIG. 5 is a flowchart illustrating an example of flow of indicator display position control processing executed at the information processing apparatus according to the present embodiment.

FIG. 5 is a flowchart illustrating an example of flow of indicator display position control processing executed at the information processing apparatus 100 according to the present embodiment.

As illustrated in FIG. 5, first, the acquiring unit 141 determines whether or not operation information of a modal having priority higher than that of gaze input is acquired (step S102). In the case where it is determined that the operation information is acquired (step S102: Yes), the display control unit 143 disables gaze input and controls the display position of the indicator on the basis of the operation information of other modals (step S104), On the other hand, in the case where it is determined that the operation information is not acquired (step S102: No), the acquiring unit 141 determines whether or not trigger information relating to a modal having priority higher than that of gaze input is acquired (step S106).

In the case where it is determined that the trigger information is acquired (step S106: Yes), the display control unit 143 disables gaze input and, in the case where operation information of other modals for which the trigger information is acquired is acquired, controls the display position of the indicator on the basis of the operation information (step S104). On the other hand, in the case where it is determined that the trigger information is not acquired (step S106: No), the display control unit 143 determines whether or not the indicator is located within the gazing region (step S108).

Then, in the case where it is determined that the indicator is located within the gazing region (step S108: Yes), the display control unit 143 disables gaze input (step S110) and maintains the position of the indicator (step S112). On the other hand, in the case where it is determined that the indicator is located outside the gazing region (step S108: No), the display control unit 143 enables gaze input (step S114) and displays the indicator at the position of the gazing point (step S116).

The operation processing example of the information processing apparatus 100 according to the present embodiment has been described above. Subsequently, a specific example where the present technology is applied will be described below.

5. SPECIFIC EXAMPLE (1) Touch Pad from which Trigger Information can be Acquired The present example is a specific example relating to a touch pad from which trigger information can be acquired. For example, the acquiring unit 141 can acquire information indicating that the finger touches the touch pad as the trigger information. Therefore, the display control unit 143 disables gaze input during a period in which the finger touches the touch pad. During this period, the display control unit 143 moves the indicator in accordance with an amount of movement of the finger on the touch pad. Meanwhile, the display control unit 143 enables gaze input during a period in which the finger does not touch the touch pad. During this period, the display control unit 143 displays the indicator at the position of the gazing point in the case where the position of the indicator goes outside the gazing region.

Here, as one of operation methods using a touch pad, there is operation of moving the finger away from the touch pad once and returning the finger to the original touched position to largely move the indicator. During a period in which the finger is moved away from the touch pad, gaze input is enabled. Therefore, in the case where the line of sight of the user faces a display object which is a target, the indicator can be automatically displayed at the position of the target. Meanwhile, in the case where the indicator is located within the gazing region, because the position of the indicator is maintained, it is possible to avoid a situation where the largely moved indicator returns to the original position.

(2) Touch Pad from which Trigger Information cannot be Acquired

The present example is a specific example relating to a touch pad from which trigger information cannot be acquired. For example, the acquiring unit 141 can acquire information indicating that the finger moves on the touch pad as operation information. Therefore, the display control unit 143 disables gaze input during a period in which information indicating that the finger moves on the touch pad is acquired. During this period, the display control unit 143 moves the indicator in accordance with an amount of movement of the finger on the touch pad. Meanwhile, during a period in which information indicating that the finger moves on the touch pad is not acquired, for example, during a period in which an amount of movement is zero while the finger touches the touch pad, the display control unit 143 enables gaze input. During this period, the display control unit 143 displays the indicator at the position of the gazing point in the case where the position of the indicator goes outside the gazing region.

(3) Gyro Mouse from which Trigger Information can be Acquired

The present example is a specific example relating to a gyro mouse from which trigger information can be acquired. For example, a touch sensor is provided on a surface of the gyro mouse, and the acquiring unit 141 can acquire information indicating that the user touches the gyro mouse as the trigger information. Therefore, the display control unit 143 disables gaze input during a period in which the finger touches the touch sensor on the gyro mouse. During this period, the display control unit 143 moves the indicator in accordance with attitude, acceleration, or the like, of the gyro mouse. Meanwhile, the display control unit 143 enables gaze input during a period in which the finger does not touch the touch sensor on the gyro mouse. During this period, the display control unit 143 displays the indicator at the position of the gazing point in the case where the position of the indicator goes outside the gazing region. For example, gaze input is enabled in the case where the finger is moved away from the touch sensor to perform button operation, or the like.

(4) Gesture Input from which Trigger Information can be Acquired

The present example is a specific example relating to gesture input from which trigger information can be acquired. For example, the acquiring unit 141 can acquire information indicating that the user raises his/her hand, that the finger is directed to a direction of the display apparatus 200, that the form of the fingers becomes a pointing form, or the like, as the trigger information. Therefore, the display control unit 143 disables gaze input during a period in which the trigger information is acquired. During this period, the display control unit 143 moves the indicator in accordance with a gesture recognition result. Meanwhile, the display control unit 143 enables gaze input during a period in which the trigger information is not acquired. During this period, the display control unit 143 displays the indicator at the position of the gazing point in the case where the position of the indicator goes outside the gazing region.

Here, concerning operation of the indicator, there are instructions such as an instruction of selecting a display object and an instruction of displaying menu, in addition to movement. For example, in gesture input, action of sticking out the hand or changing the form of the hand can be assigned to these instructions. During a period in which gesture to which such an instruction is assigned is performed, for example, because the form of the fingers changes to a form other than a pointing form without the position of the hand moving, there is a case where neither operation information nor trigger information is acquired. In this case, because the position of the indicator is maintained in the case where the position of the indicator is located within the gazing region, it is possible to avoid a situation where the position of the indicator is displaced during a period in which such gesture is performed or before or after the period. Further, during a period in which gesture to which such an instruction is assigned is performed, even if the trigger information is not acquired, gaze input may be disabled. In this case, even if the position of the indicator is located outside the gazing region, it is possible to avoid a situation where the position of the indicator is displaced. Note that in the case where a selection instruction, or the like, is provided using other modals such as voice input, because the user can provide a selection instruction, or the like, while moving the indicator, the information processing apparatus 100 can omit the above-described operation.

(5) Cursor Input from which Trigger Information cannot be Acquired

The present example is a specific example in the case where a cursor is operated using a cursor key of a keyboard. For example, the acquiring unit 141 can acquire information indicating that the cursor key is depressed as operation information. Therefore, the display control unit 143 disables gaze input during a period in which the information indicating that the cursor key is depressed is acquired. During this period, the display control unit 143 moves the indicator in a direction corresponding to the depressed cursor key. Meanwhile, the display control unit 143 enables gaze input during a period in which the information indicating that the cursor key is depressed is not acquired. During this period, the display control unit 143 displays the indicator at the position of the gazing point in the case where the position of the indicator goes outside the gazing region.

The specific examples where the present technology is applied have been described above.

6. EXAMPLE OF HARDWARE CONFIGURATION

Figure 6:
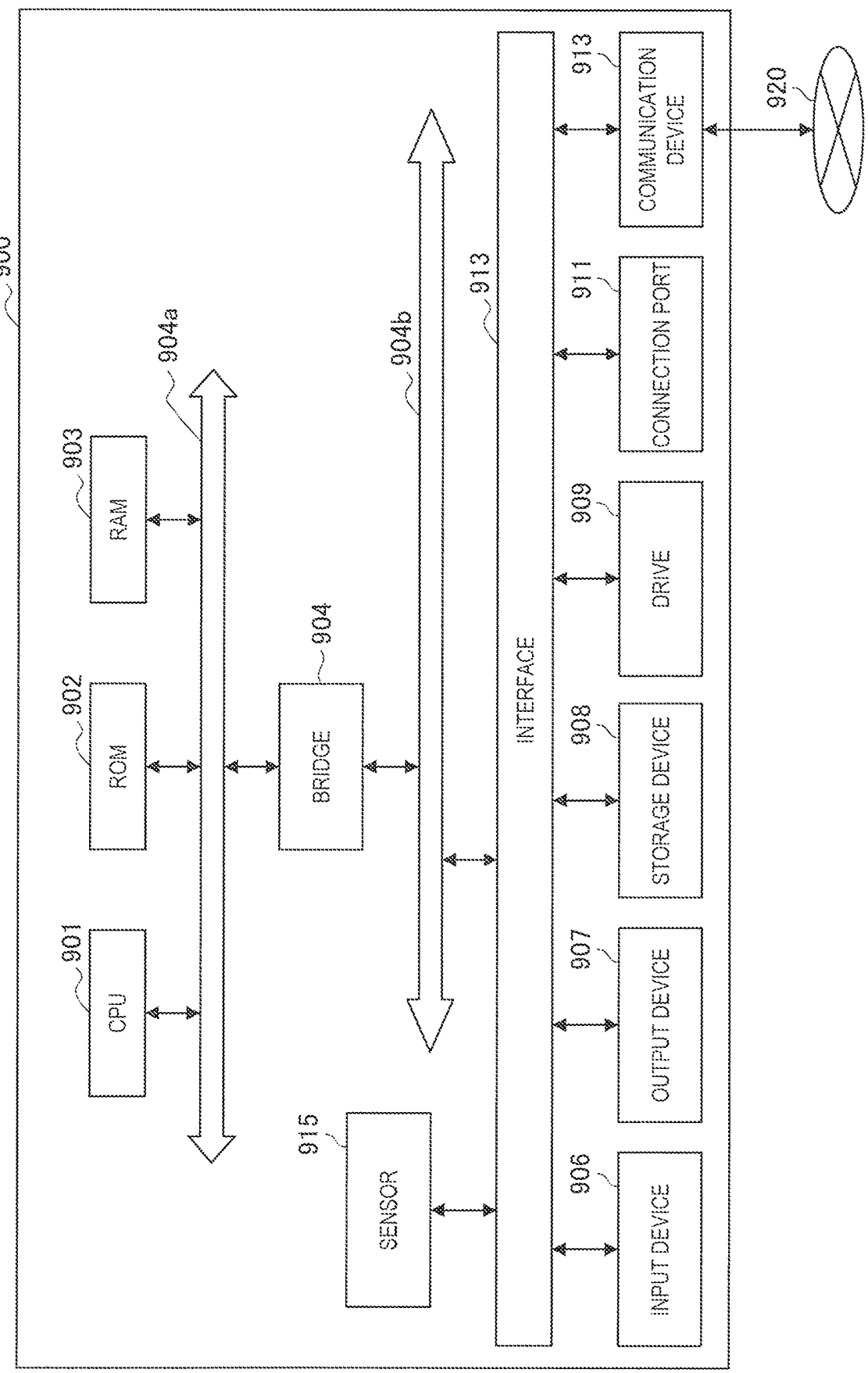
FIG. 6 is a block diagram illustrating an example of a hardware configuration of the information processing apparatus according to the present embodiment.

Finally, a hardware configuration of an information processing apparatus according to the present embodiment will be described with reference to FIG. 6. FIG. 6 is a block diagram illustrating an example of the hardware configuration of the information processing apparatus according to the present embodiment. Meanwhile, the information processing apparatus 900 illustrated in FIG. 6 may realize the information processing apparatus 100 illustrated in FIG. 2, for example. Information processing by the information processing apparatus 100 according to the present embodiment is realized according to cooperation between software and hardware described below.

As illustrated in FIG. 6, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911, a communication device 913 and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. The CPU 901 may form the controller 140 illustrated in FIG. 2, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, for example, a mouse, a keyboard, a touch panel, a button, a microphone, a switch, a lever of the like. In addition, the input device 906 may be a remote control device using infrared ray or other electric waves or external connection equipment such as a cellular phone or a PDA corresponding to manipulation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by manipulating the input device 906.

The output device 907 is formed by a device that may visually or aurally notify the user of acquired information. As such devices, there is a display device such as a CRT display device, a liquid crystal display device, a plasma display device, an EL display device, a laser projector, a LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording medium recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 130 illustrated in FIG. 2, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the communication unit 120 illustrated in FIG. 2, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

The sensor 915 is various kinds of sensors such as, for example, a camera, a stereo camera, a time-of-flight (TOF) scheme distance sensor and a microphone. The sensor 915 acquires information indicating gesture or voice of the user, direction or movement of the line of sight of the user, or the like. The sensor 915 can, for example, constitute the sensor unit 110 illustrated in FIG. 2.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

7. CONCLUSION

An embodiment of the present disclosure has been described in detail above with reference to FIG. 1 to FIG. 6. As described above, the information processing apparatus 100 according to the present embodiment acquires operation information and determines whether or not to perform display control of the indicator using gaze input in accordance with whether or not a difference between the position of the indicator indicated by the operation information and the position of the gazing point of the user exceeds a threshold. By this means, as long as the difference between the position of the indicator and the position of the gazing point does not exceed the threshold, it is possible to avoid movement of the indicator in accordance with movement of the line of sight, such as wobble of the line of sight, which is not intended to be used for input. The information processing apparatus 100 therefore can move the indicator in accordance with movement of the line of sight which is intended to be used for input, in the case where the difference between the position of the indicator and the position of the gazing point exceeds the threshold.

Further, the information processing apparatus 100 according to the present embodiment can preferentially reflect operation using a modal with higher priority on the display position of the indicator on the basis of priority set for each modal. By this means, it is possible to realize appropriate combination of gaze input and other modals, for example, operation involving a large amount of movement being performed using gaze input, while subsequent minute operation being performed using touch input, or the like, so that it is possible to improve convenience of the user.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is not necessary for the processing described in this specification with reference to the flowchart to be executed in the order shown in the flowchart. Some processing steps may be performed in parallel. Further, some of additional steps can be adopted, or some processing steps can be omitted.

Meanwhile, devices described in the specification may be realized as independents devices or part of or all devices may be realized as separate devices. For example, in the example of the functional configuration of the information processing apparatus 100 illustrated in FIG. 2, the storage unit 130 and the controller 140 may be included in a device such as a server connected to the sensor unit 110 and the communication unit 120 through a network or the like.

Further, each apparatus described in the present specification may be implemented as separate apparatuses or may be implemented as an integrally formed apparatus. For example, the information processing apparatus 100 and the display apparatus 200 may be integrally formed, or the information processing apparatus 100 and the operating apparatus 300 may be integrally formed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquiring unit configured to acquire information indicating user operation; and a display control unit configured to determine whether or not to control a display position of an indicator using gaze input in accordance with whether or not a difference between a position of the indicator indicating an operation position operated by a user indicated by the information acquired by the acquiring unit and a position of a gazing point of the user exceeds a threshold.

(2)

The information processing apparatus according to (1), in which the display control unit sets the threshold in accordance with accuracy of detection of the position of the gazing point.

(3)

The information processing apparatus according to (1) or (2), in which the display control unit sets the threshold in accordance with a distance between a position of an eye of the user and the position of the gazing point.

(4)

The information processing apparatus according to any one of (1) to (3), in which the display control unit sets the threshold in accordance with displayed content.

(5)

The information processing apparatus according to (1), in which the display control unit sets a fixed value as the threshold.

(6)

The information processing apparatus according to any one of (1) to (5), in which the display control unit selects information indicating user operation to be reflected on display from information indicating user operation using one or more input means acquired by the acquiring unit, in accordance with priority set for each input means.

(7)

The information processing apparatus according to (6), in which the display control unit determines whether or not to control the display position of the indicator using gaze input in accordance with whether or not information indicating user operation using input means for which priority higher than priority of input means using the position of the gazing point is set is acquired.

(8)

The information processing apparatus according to (6) or (7), in which the display control unit determines whether or not to control the display position of the indicator using gaze input in accordance with whether or not information indicating that the indicator is intended to be moved using input means for which priority higher than priority of input means using the position of the gazing point is set is acquired.

(9)

The information processing apparatus according to any one of (1) to (8), in which the display control unit determines whether or not to display the indicator at the position of the gazing point.

(10)

An information processing method executed by a processor, the method including:

acquiring information indicating user operation; and determining whether or not to control a display position of an indicator using gaze input in accordance with whether or not a difference between a position of the indicator indicating an operation position operated by a user indicated by the acquired information and a position of a gazing point of the user exceeds a threshold.

(11)

A program causing a computer to function as:

an acquiring unit configured to acquire information indicating user operation; and a display control unit configured to determine whether or not to control a display position of an indicator using gaze input in accordance with whether or not a difference between a position of the indicator indicating an operation position operated by a user indicated by the information acquired by the acquiring unit and a position of a gazing point of the user exceeds a threshold.

REFERENCE SIGNS LIST 1 information processing system
10 indicator
20 gazing point
30 gazing region
100 information processing apparatus
110 sensor unit
120 communication unit
130 storage unit
140 control unit
141 acquiring unit
143 display control unit
200 display apparatus
300 operating apparatus

The invention claimed is:

1. An information processing apparatus, comprising:
a storage unit;
an acquiring unit configured to acquire first information indicating a first user operation; and
a display control unit configured to:
set a first threshold value based on an accuracy of detection of a first position of a gazing point of a user;
control a display position of an indicator on a display device based on a gaze input and a difference between a first position of the indicator and the first position of the gazing point of the user, wherein
the difference exceeds the set first threshold value, and
the first position of the indicator is based on the first user operation;
change the display position of the indicator from the first position of the indicator to a second position of the indicator based on the control, wherein the second position of the indicator corresponds to the first position of the gazing point of the user;
control the storage unit to store the first position of the gazing point of the user and the second position of the indicator; and
control the display position of the indicator to return to the stored second position of the indicator based on a displacement of the gazing point of the user from the stored first position of the gazing point to a second position of the gazing point within a specific time period.

2. The information processing apparatus according to claim 1, wherein the display control unit is further configured to set the first threshold value based on content displayed on the display device.

3. The information processing apparatus according to claim 1, wherein the display control unit is further configured to set a fixed value as the first threshold value.

4. The information processing apparatus according to claim 1, wherein
the acquiring unit is further configured to acquire second information indicating a plurality of user operations, and
the display control unit is further configured to:
select a second user operation of the plurality of user operations based on a priority set for each of the plurality of user operations; and
control the display position of the indicator on the display device based on the second user operation.

5. The information processing apparatus according to claim 4, wherein the display control unit is further configured to control the display position of the indicator using the gaze input, based on a priority of the gaze input that is higher than the priority of the second user operation.

6. The information processing apparatus according to claim 4, wherein
the display control unit is further configured to control the display position of the indicator using the gaze input, based on third information indicating a third user operation of the plurality of user operations,
the third user operation corresponds to a movement of the indicator, and
a priority of the gaze input is higher than the priority of the third user operation.

7. The information processing apparatus according to claim 1, wherein the display control unit is further configured to control the display device to display the indicator at the second position of the indicator corresponding to the first position of the gazing point.

8. An information processing method, comprising:
acquiring information indicating a user operation;
setting a threshold value based on an accuracy of detection of a first position of a gazing point of a user;
controlling a display position of an indicator on a display device based on a gaze input and a difference between a first position of the indicator and the first position of the gazing point of the user, wherein
the difference exceeds the set threshold value, and
the first position of the indicator is based on the user operation;
changing the display position of the indicator from the first position of the indicator to a second position of the indicator based on the control, wherein the second position of the indicator corresponds to the first position of the gazing point of the user;
controlling a storage unit to store the first position of the gazing point of the user and the second position of the indicator; and
controlling the display position of the indicator to return to the stored second position of the indicator based on a displacement of the gazing point of the user from the stored first position of the gazing point to a second position of the gazing point within a specific time period.

9. A non-transitory computer-readable medium having stored thereon computer-executable instructions, which when executed by an information processing apparatus, cause the information processing apparatus to execute operations, the operations comprising:
acquiring, by an acquiring unit of the information processing apparatus, information indicating a user operation;
setting, by a display control unit of the information processing apparatus, a threshold value based on an accuracy of detection of a first position of a gazing point of a user;
controlling, by the display control unit, a display position of an indicator on a display device based on a gaze input and a difference between a first position of the indicator and the first position of the gazing point of the user, wherein
the difference exceeds the set threshold value, and
the first position of the indicator is based on the user operation;
changing, by the display control unit, the display position of the indicator from the first position of the indicator to a second position of the indicator based on the control, wherein the second position of the indicator corresponds to the first position of the gazing point of the user;
controlling, by the display control unit, a storage unit of the information processing apparatus to store the first position of the gazing point of the user and the second position of the indicator; and
controlling, by the display control unit, the display position of the indicator to return to the stored second position of the indicator based on a displacement of the gazing point of the user from the stored first position of the gazing point to a second position of the gazing point within a specific time period.

10. The information processing apparatus according to claim 1, wherein the display control unit is further configured to:
set the first threshold value based on a distance between a position of an eye of the user and the first position of the gazing point; and
disable the gaze input based on a speed of a movement of a line of sight of the user that is below a second threshold value.

* * * * *